(12) United States Patent
Liu et al.

(10) Patent No.: US 8,038,220 B2
(45) Date of Patent: Oct. 18, 2011

(54) ADJUSTABLE POSITIONER FOR VEHICLE SEAT BACK HEADREST

(75) Inventors: Hsing Lung Lewis Liu, Wixom, MI (US); Karl A. Murphy, Novi, MI (US); Venugopala C. Mittapalli, Canton, MI (US)

(73) Assignee: Porter Group, LLC, Novi, MI (US)

( * ) Notice: Subject to any disclaimer, the term of this patent is extended or adjusted under 35 U.S.C. 154(b) by 191 days.

(21) Appl. No.: 12/356,565

(22) Filed: Jan. 21, 2009

(65) Prior Publication Data

US 2009/0236894 A1    Sep. 24, 2009

Related U.S. Application Data

(60) Provisional application No. 61/062,030, filed on Jan. 23, 2008.

(51) Int. Cl.
*A47C 1/10* (2006.01)
(52) U.S. Cl. ............... 297/410; 297/411.36; 297/463.1; 297/463.2

(58) Field of Classification Search .............. 297/410, 297/411.36, 463.1, 463.2
See application file for complete search history.

(56) References Cited

U.S. PATENT DOCUMENTS

| 3,874,480 | A | | 4/1975 | Porter et al. | |
|---|---|---|---|---|---|
| 4,589,698 | A | * | 5/1986 | Suzuki | 297/410 |
| 4,657,425 | A | * | 4/1987 | Takahashi | 403/104 |
| 5,157,826 | A | | 10/1992 | Porter et al. | |
| 5,895,094 | A | * | 4/1999 | Mori et al. | 297/410 |
| 7,108,327 | B2 | * | 9/2006 | Locke et al. | 297/410 |
| 7,735,929 | B2 | * | 6/2010 | Veine et al. | 297/410 |

FOREIGN PATENT DOCUMENTS

| FR | 2819456 A1 | * | 7/2002 |
|---|---|---|---|
| GB | 2315409 A | * | 2/1998 |

* cited by examiner

*Primary Examiner* — Laurie Cranmer
(74) *Attorney, Agent, or Firm* — Brooks Kushman P.C.

(57) ABSTRACT

A vehicle seat headrest (14) is mounted on a vehicle seat back (12) for infinite position vertical adjustment by helical spring clamping and unclamping of a support shaft of the headrest.

2 Claims, 3 Drawing Sheets

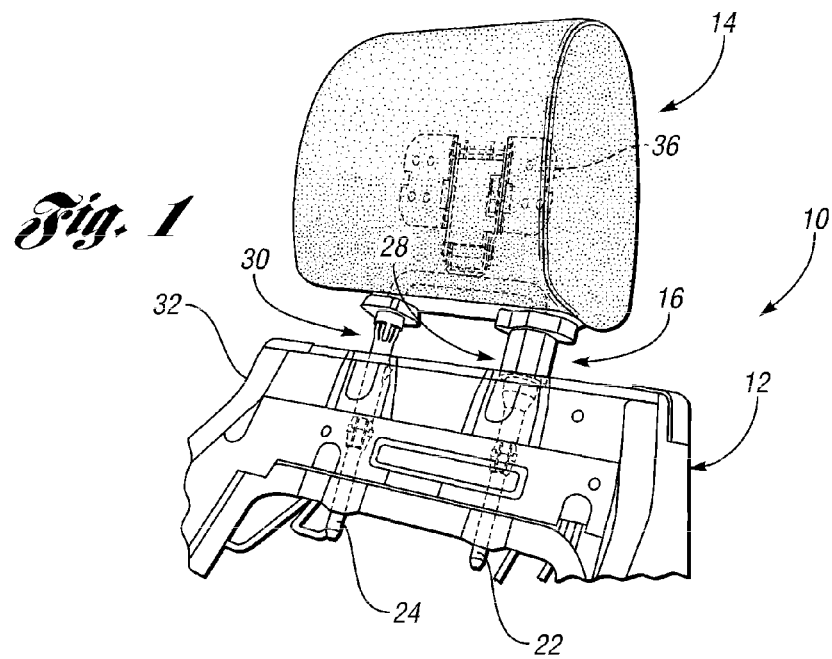
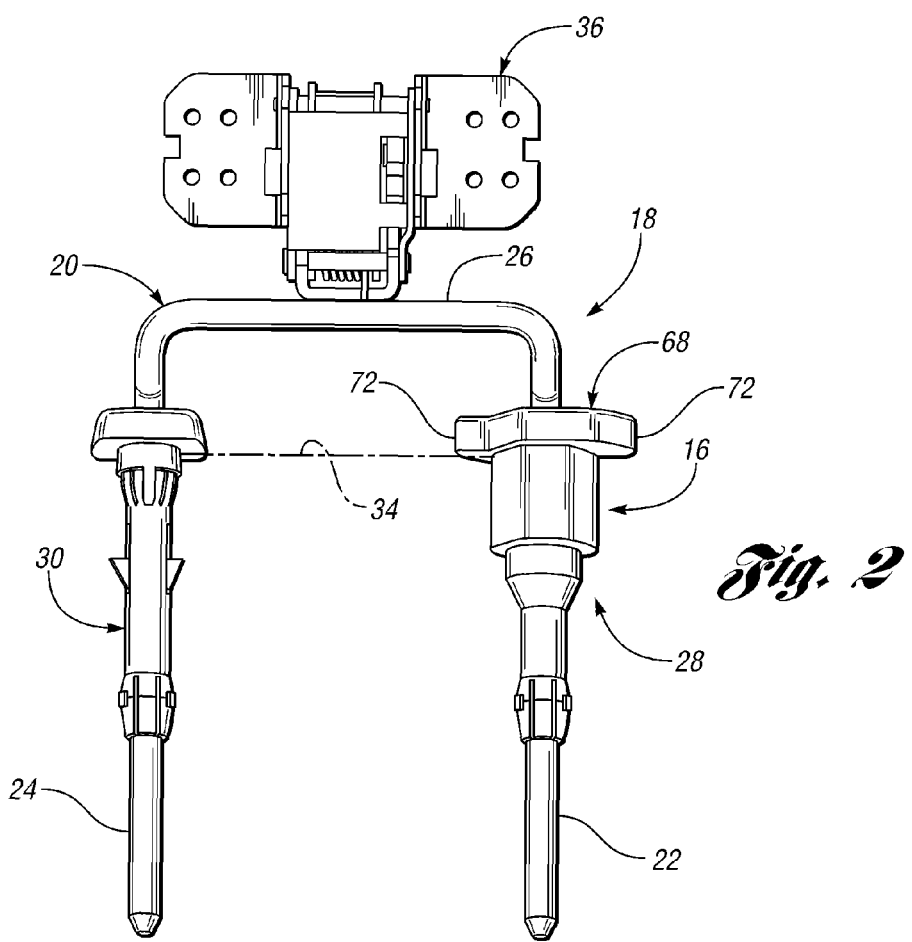

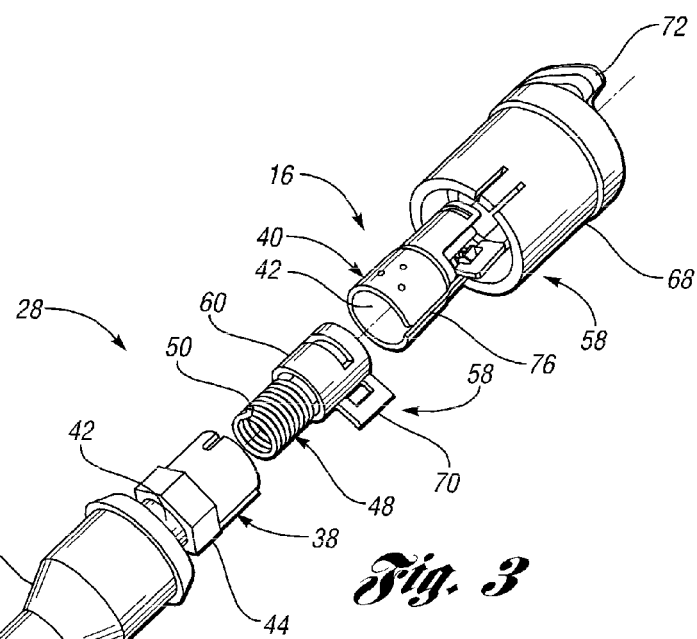
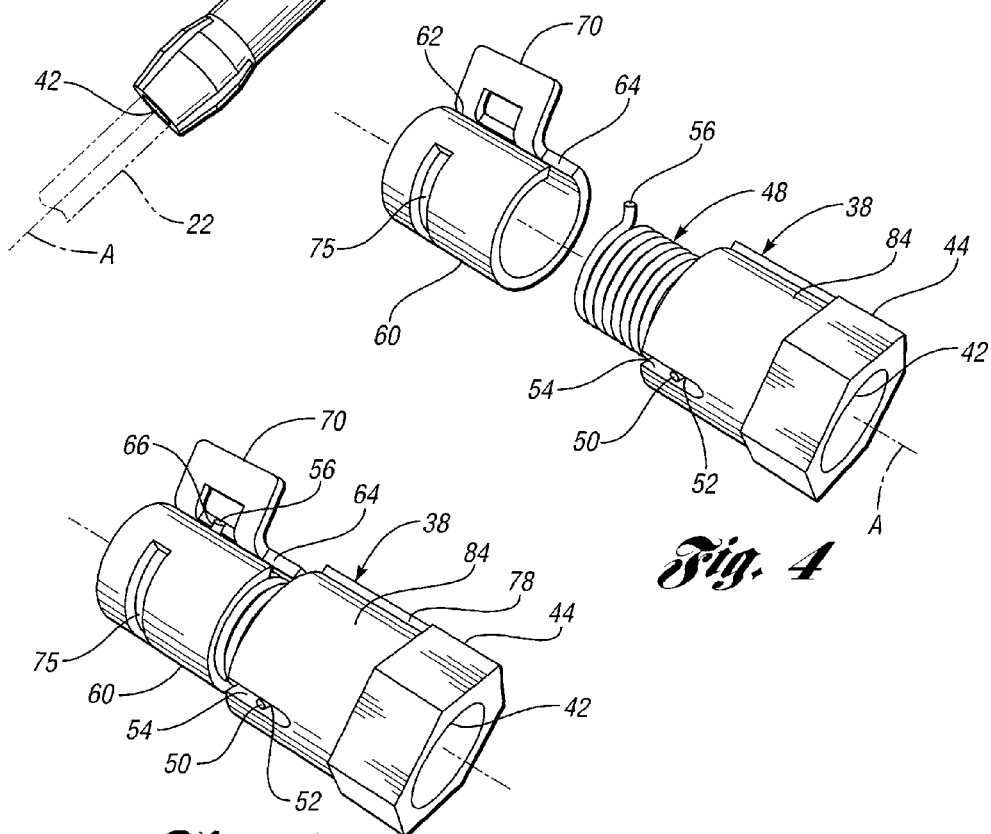

ADJUSTABLE POSITIONER FOR VEHICLE SEAT BACK HEADREST

CROSS-REFERENCE TO RELATED APPLICATIONS

This application claims the benefit of U.S. provisional application Ser. No. 61/062,030 filed Jan. 23, 2008.

BACKGROUND OF THE INVENTION

1. Field of the Invention

This invention relates to a positioner for adjustably positioning a headrest on a vehicle seat back and also relates to a vehicle headrest positioning assembly that includes the positioner.

2. Background Art

Vehicle seat backs conventionally include headrests that are vertically adjustable to a finite number of positions by a latching mechanism. Such latching mechanisms conventionally include a pair of support shafts that support the headrest and also include seat back mounted sockets one of which includes a latch mechanism. The shaft received within the socket having the latch mechanism includes vertically spaced notches that permit the adjustment of the headrest for positioning in one of the selected positions.

SUMMARY OF THE INVENTION

An object of the invention is to provide an improved adjustable positioner for positioning a headrest on a vehicle seat back to permit vertical infinite positioning adjustment movement.

In carrying out the above object, a positioner for adjustably positioning a headrest on a vehicle seat back in accordance with the invention includes a housing for mounting adjacent an upper extremity of a vehicle seat back and having a hole that extends generally vertically through the housing along a positioning axis. The positioner includes a shaft for mounting a vehicle headrest and for extending downwardly therefrom for insertion into the hole of the housing. A helical spring extends around the shaft within the hole in the housing and has first and second ends, with the first end of the helical spring having a connection to the housing to provide positioning of the helical spring with respect to the housing, and with the helical spring having a diameter of a size for clamping to the shaft to prevent vertical movement of the headrest with respect to the seat back. An actuator of the positioner is operable to rotate the second end of the helical spring to unwind the helical spring and unclamp the shaft to permit vertical infinite positioning adjusting movement of the shaft and the headrest supported thereby with respect to the seat back.

As disclosed, the housing of the headrest positioner includes an inner housing portion that defines a lower portion of the generally vertical hole, that is mounted on the seat back, and that includes an opening embodying the connection for the first end of the helical spring, and the housing includes an outer housing portion for mounting on the inner housing portion. The actuator includes a rotatable sleeve mounted within the inner housing portion and within the outer housing portion and having an opening that receives the second end of the helical spring to provide a connection to the spring. The disclosed actuator also includes a manual knob that is positioned above the seat back and connected to the rotatable sleeve to permit manually actuated rotation of the sleeve and the second end of the helical spring to provide unclamping of the shaft for vertical adjustment of the headrest. The housing also includes a housing mount for mounting on the seat back.

The inner housing portion as disclosed includes a lower portion supported by the housing mount and having an outer surface configured to prevent rotation with respect to the housing mount. The inner housing has a round upper portion, and the outer housing portion has a round surface that receives the round upper portion of the inner housing portion to provide the rotatable support of the sleeve whose rotation is controlled by the manual knob of the actuator.

The first and second ends of the helical spring as disclosed extend radially with respect to the positioning axis about which the helical spring extends, and the opening of the inner housing portion and the opening of the rotatable sleeve respectively receive the radially extending first and second ends of the helical spring to provide the connections. More specifically, the opening of the inner housing portion and the opening of the rotatable sleeve each have an axial portion extending parallel to the positioning axis to permit relative movement between the inner housing portion and the rotatable sleeve along the positioning axis as the radially extending first and second ends of the helical spring respectively move thorough the axial portions of the openings during assembly of the positioner.

The manual knob of the actuator extends around the shaft and includes at least one lobe extending radially with respect to the positioning axis to facilitate manual rotation of the knob for unclamping of the shaft by the helical spring for the vertical adjustment. As disclosed the manual knob includes a pair of radially extending lobes located at diametrically opposite locations from each other about the positioning axis.

Another object of the present invention is to provide an improved positioning assembly for a headrest on a vehicle seat back.

In carrying out the above object, a vehicle seat back headrest constructed in accordance with the present invention includes a pair of housings for mounting on an upper extremity of a vehicle seat back in a spaced relationship from each other and with each housing having a hole that extends generally vertically through the housing along an associated positioning axis. A headrest support of the positioning assembly has a generally inverted U shape which has a horizontally extending support portion for mounting a vehicle headrest and also has a pair of vertically extending shafts extending downwardly from the support portion and respectively received by the holes of the pair of housings. A helical spring extends around one of the shafts within the hole in the one of the housings and having first and second ends. The first end of the helical spring having a connection to the one housing to provide positioning of the helical spring with respect to the one housing, and the helical spring having a diameter of a size for clamping to the one shaft to prevent vertical movement of the headrest with respect to the seat back. An actuator is operable to rotate the second end of the helical spring to unwind the helical spring and unclamp the one shaft to permit vertical infinite positioning adjusting movement of the shaft and the headrest supported thereby with respect to the seat back.

The objects, features and advantages of the present invention are readily apparent from the following detailed description of the preferred embodiments when taken in connection with the accompanying drawings.

BRIEF DESCRIPTION OF THE DRAWINGS

FIG. 1 is a partial perspective view of a vehicle seat back supporting a headrest by an adjustable positioner constructed in accordance with the present invention.

FIG. 2 is a generally elevational view looking rearwardly with the seat back and headrest broken away to show the adjustable positioner.

FIG. 3 is an exploded perspective view of a housing, an actuator and a spring of the adjustable positioner.

FIG. 4 is an exploded perspective view showing the housing inner portion, the spring and a sleeve of the adjustable positioner.

FIG. 5 is also a perspective view showing the housing inner portion, the spring, and the sleeve assembled.

DETAILED DESCRIPTION OF THE PREFERRED EMBODIMENT

Figure 6:
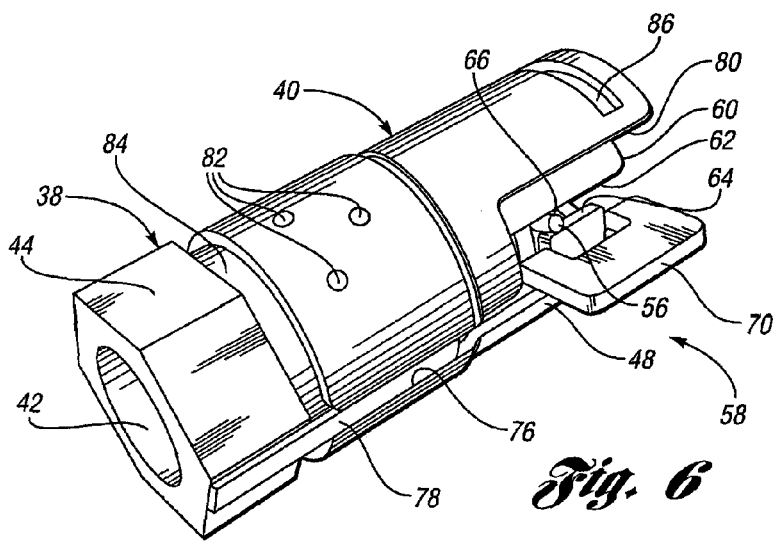
FIG. 6 is a perspective view showing the housing inner position, the spring, the sleeve and a housing outer position assembled.

With reference to FIG. 1, a vehicle seat that is only partially shown is generally indicated by 10 and includes a generally upstanding seat back 12 on which a headrest 14 is supported for vertical adjustment by a positioner 16 constructed in accordance with the present invention. This headrest positioner 16 as shown in FIG. 2 is part of a headrest positioning assembly 18 that supports the headrest 14 on the seat back for infinite positioning vertical adjustment. Both the vehicle seat back headrest positioner 16 and the positioning assembly 18 will be described in an integrated manner to facilitate an understanding of different aspects of the invention.

With combined reference to FIGS. 1 and 2, the positioning assembly 18 includes a headrest support 20 having a generally inverted U-shape including a pair of shafts 22 and 24 connected by a generally horizontal cross member 26. Housings 28 and 30 are mounted on a frame 32 (FIG. 1) of the seat back 12 and have upper extremities that extend just slightly above the seat trim line 34 (FIG. 2) after the vehicle padding and upholstery, etc. have been fabricated on the seat. A headrest frame 36 is mounted on the support shaft 26 of the headrest support 20 as shown in FIG. 2 and is covered by the headrest padding, upholstery, etc. as shown in FIG. 1. Positioner 16 as described below provides infinite position vertical adjustment of the headrest support 20 on the housing 28 by cooperation with the associated shaft 22, while the housing 30 provides vertical sliding support for its associated vertical shaft 24.

With reference to FIGS. 3-5, the positioner 16 has its housing 28 constructed to include an inner housing portion 38, and an outer housing portion 40 that define a hole 42 through which the associated headrest support shaft 22 extends along a positioning axis A for vertical adjustment as previously discussed in connection with FIG. 2. The inner housing portion 38 as disclosed is made from powdered metal and has a lower hexagonal shape 44 that is received within a housing mount 46 shown in FIG. 3. The housing mount 46 is made from a suitable plastic and has a complementary shape for receiving the hexagonal shape 44 of the inner housing portion 38 in order to prevent its rotation during vertical adjustment of the headrest as is hereinafter more fully described.

The headrest positioner 16 also includes a spring 48 that extends around the headrest support shaft 22 and includes a first end 50 having a radially extending portion and a connection 52 to the housing 28 and disclosed as being at the inner housing portion 38 within a slot 54 that extends along the positioning axis A. Spring 48 also has a second end 56 which as disclosed in FIG. 4 like the first end has a radially extending portion. Both of the radially extending portions of the spring ends extend radially with respect to the axis A of adjustment and embody distal extremities of the respective spring ends. The spring 48 has a diameter for clamping on to the associated headrest support shaft 22 to prevent vertical movement of the headrest with respect to the seat back.

An actuator is collectively indicated by 58 in FIG. 3 and is operable to unwind the helical spring 48 and unclamp the associated headrest shaft 22 to permit vertical infinite positioning adjusting movement of the shaft and the headrest supported by the shaft with respect to the seat back as previously described.

Figure 8:
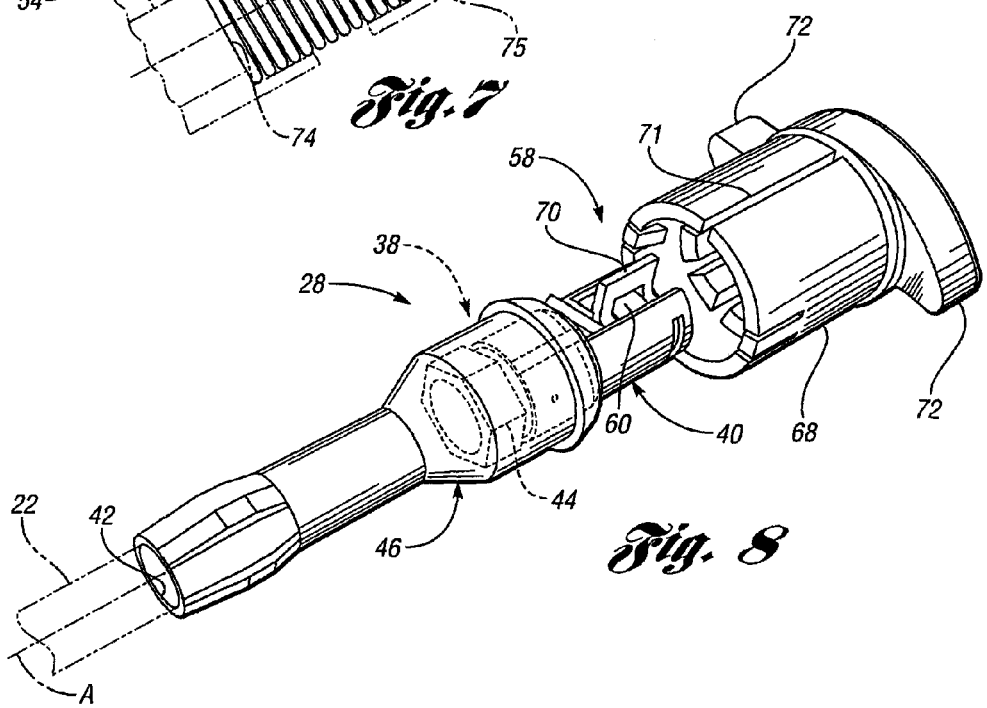
FIG. 8 is an exploded perspective view similar to FIG. 3.

The actuator 58 shown in FIG. 3 includes a rotatable sleeve 60 that upon assembly is mounted within the inner housing portion 38 and within the outer housing portion 40 and has an opening 62 disclosed in FIG. 4 as a slot 64 for receiving the second end 56 of the spring 48 to provide a connection 66 (FIGS. 5 and 6) to the spring. A manual knob 68 is positioned above the seat back as shown in FIG. 2 and contacts the rotatable sleeve at a radial tab 70 thereof to provide rotation of the sleeve that unwinds the spring 48 to permit the vertical adjustment. More specifically, a slot 71 (FIG. 8) of the knob 68 receives the radial tab 70 of the sleeve 60 to rotate the sleeve and unwind the spring 48. Manual release of the knob 68 allows the resilient bias of the spring 48 to rotate the sleeve 60 and knob 68 back into the original position where the spring clamps the headrest support shaft 22. The manual knob 68 as disclosed includes at least one lobe 72 extending radially with respect to the positioning axis to facilitate manual rotation of the knob for unclamping of the shaft by the spring for the vertical adjustment, and as disclosed there are a pair of the radially extending lobes 72 located at diametrically opposite locations from each other about the positioning axis.

Helical spring locking has previously been used as disclosed by U.S. Pat. No. 3,874,480 Porter et al. and U.S. Pat. No. 5,157,826 Porter et al., the entire disclosures of which are hereby incorporated by reference.

Figure 7:
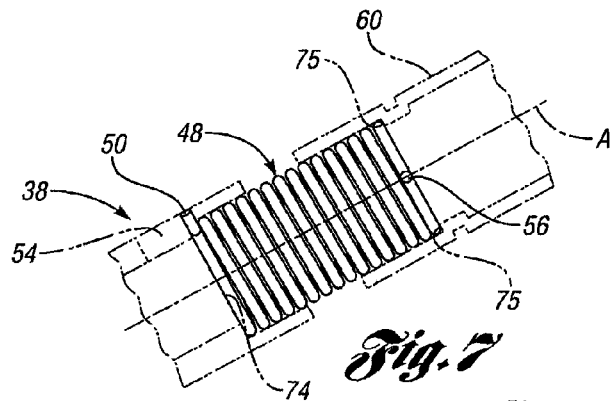
FIG. 7 is a schematic view showing curved ramp surfaces of the housing inner portion and the sleeve for seating the spring ends.

As shown in FIG. 7, the inner housing portion 38 has a round inclined ramp seat 74 that seats the spring 48 adjacent its first end 50, and the rotatable sleeve 60 has a round inclined ramp seat 75 that seats the spring 48 at its second end 56 to provide the clamping and unclamping upon actuated rotation of the sleeve 60 while accommodating for the axial extent of the helical spring.

Assembly of the actuator 58 is performed by axial movement of the spring 48 into the inner housing portion 38 as shown in FIG. 4 so that its first end 50 is received within the slot 54 defining the opening 52 that fixes this end of the spring with respect to rotation about the positioning axis A. Sleeve 60 is inserted around the outwardly projecting portion of the spring 48 with the second end of the spring 56 being received by the axial slot 64 defining its opening that fixes the sleeve with respect to the second spring end. The outer housing portion 40 is moved axially and an axial slot 76 (FIG. 6) receives an axial projection 78 on the inner housing portion 38 as well as permitting the sleeve tab 70 to move into a circumferential opening 80 where its rotational movement is permitted. Deformations 82 secure the outer housing portion 40 to a round portion 84 of the inner housing portion 38, and a circumferential deformation 86 axially engages the end of the rotatable sleeve 60 to maintain its assembly.

After its assembly, the positioner 16 is inserted into the housing mount 46 so that its inner housing portion hexagonal shape 44 is fixed against rotation. The knob 68 is then inserted over the positioner and has a formation for providing rotational support with respect thereto while being axially held in position after assembly. Subsequently, the rotation of the knob 68 rotates the actuator to provide the spring unclamping that permits vertical headrest adjustment to any of a number of infinite positions.

While the preferred embodiment of the invention has been illustrated and described, it is not intended that this embodiment illustrates and describes all possible forms of the invention. Rather, the words used in the specification are words of description rather than limitation, and it is understood that various changes may be made without departing from the spirit and scope of the invention.

What is claimed is:

1. A positioning assembly for a headrest on a vehicle seat back, comprising:
    a pair of housings for mounting on an upper extremity of a vehicle seat back in a spaced relationship from each other, and each housing having a hole that extends generally vertically through the housing along an associated positioning axis;
    a headrest support of a generally inverted U shape having a horizontally extending support portion for mounting a vehicle headrest and also having a pair of vertically extending shafts extending downwardly from the support portion and respectively received by the holes of the pair of housings;
    one of the housings having an inner housing portion, a housing mount for mounting the inner housing portion on the seat back, the inner housing portion defining a lower portion of the generally vertical hole of the one housing, and the inner housing portion having an opening and an inclined ramp, the one housing also including an outer housing portion that receives the inner housing portion;
    the one housing having a single helical spring that extends around the shaft within the hole of the one housing and the helical spring having first and second ends including portions that extend radially with respect to the positioning axis of the one housing, the radially extending portion of first end of the helical spring being received within the opening in the inner housing portion of the one housing to provide positioning of the helical spring with respect to the one housing, the helical spring adjacent the first end thereof being seated by the inclined ramp of the inner housing portion of the one housing, and the helical spring having a diameter of a size for clamping to the one shaft to prevent vertical movement of the headrest with respect to the seat back;
    an actuator including a rotatable sleeve mounted within the outer housing portion of the one housing, the rotatable sleeve having an opening that receives the radially extending portion of the second end of the helical spring to provide a connection to the helical spring, the rotatable sleeve having an inclined ramp and a radial tab, the helical spring adjacent the second end thereof being seated by the inclined ramp of the rotatable sleeve, and the actuator also including a manual knob that is positioned above the seat back and having a slot that receives the radial tab of the rotatable sleeve to permit manually actuated rotation of the rotatable sleeve and the second end of the helical spring by rotation of the manual knob to unwind the helical spring and provide unclamping of the shaft of the one housing for infinite position vertical adjustment of the headrest with respect to the seat back; and
    the opening of the inner housing portion and the opening of the rotatable sleeve each having an axial portion extending parallel to the positioning axis of the one housing to permit relative movement between the inner housing portion and the rotatable sleeve along the positioning axis of the one housing as the radially extending first and second ends of the helical spring respectively move through the axial portions of the openings during assembly.

2. A vehicle seat back headrest positioner as in claim 1 wherein the manual knob includes a pair of radially extending lobes located at diametrically opposite locations from each other about the positioning axis.

* * * * *